United States Patent [15] 3,656,122

Pasternack [45] Apr. 11, 1972

[54] TIME-SHARED SHIFT REGISTER COUNTER WITH COUNT MODIFIED EACH NTH RECIRCULATION

[72] Inventor: Gerald P. Pasternack, Colts Neck, N.J.

[73] Assignee: Bell Telephone Laboratories, Incorporated, Murray Hill, N.J.

[22] Filed: Dec. 11, 1969

[21] Appl. No.: 884,252

[52] U.S. Cl. ................340/173 RC, 235/92 SH, 235/92 NG, 307/221, 307/223

[51] Int. Cl. ...............G11c 19/00, H03k 27/00, H03k 23/02

[58] Field of Search ..............340/173 RC; 235/92 T, 92 MT, 235/92 TE, 92 SH, 92 NG; 307/221, 223

[56] References Cited

UNITED STATES PATENTS

| | | | |
|---|---|---|---|
| 2,997,233 | 8/1961 | Selmer | 235/92 SH |
| 3,153,776 | 10/1964 | Schwartz | 340/173 RC |
| 3,523,284 | 8/1970 | Washizuka | 340/173 RC |
| 3,127,507 | 3/1964 | Martens | 235/92 SH |
| 3,535,698 | 10/1970 | Martin | 340/173 RC |
| 3,413,618 | 11/1968 | Shuba | 340/173 RC |

*Primary Examiner*—Bernard Konick
*Assistant Examiner*—Stuart Hecker
*Attorney*—R. J. Guenther and Kenneth B. Hamlin

[57] ABSTRACT

Numbers representing time periods are stored in a plurality of shift registers, each register being associated with a digit of the stored number. Each shift register has a plurality of stages, equal in number to the number of time periods which are served by the counter. The number derived from the output of the shift register is recirculated to the input through an adder, the number count being thereby increased to correspond to elapsed time. The number count is increased, however, only during every *n*th recirculation to reduce the magnitude of the number which defines an elapsed time period thereby reducing the number of shift registers required.

4 Claims, 1 Drawing Figure

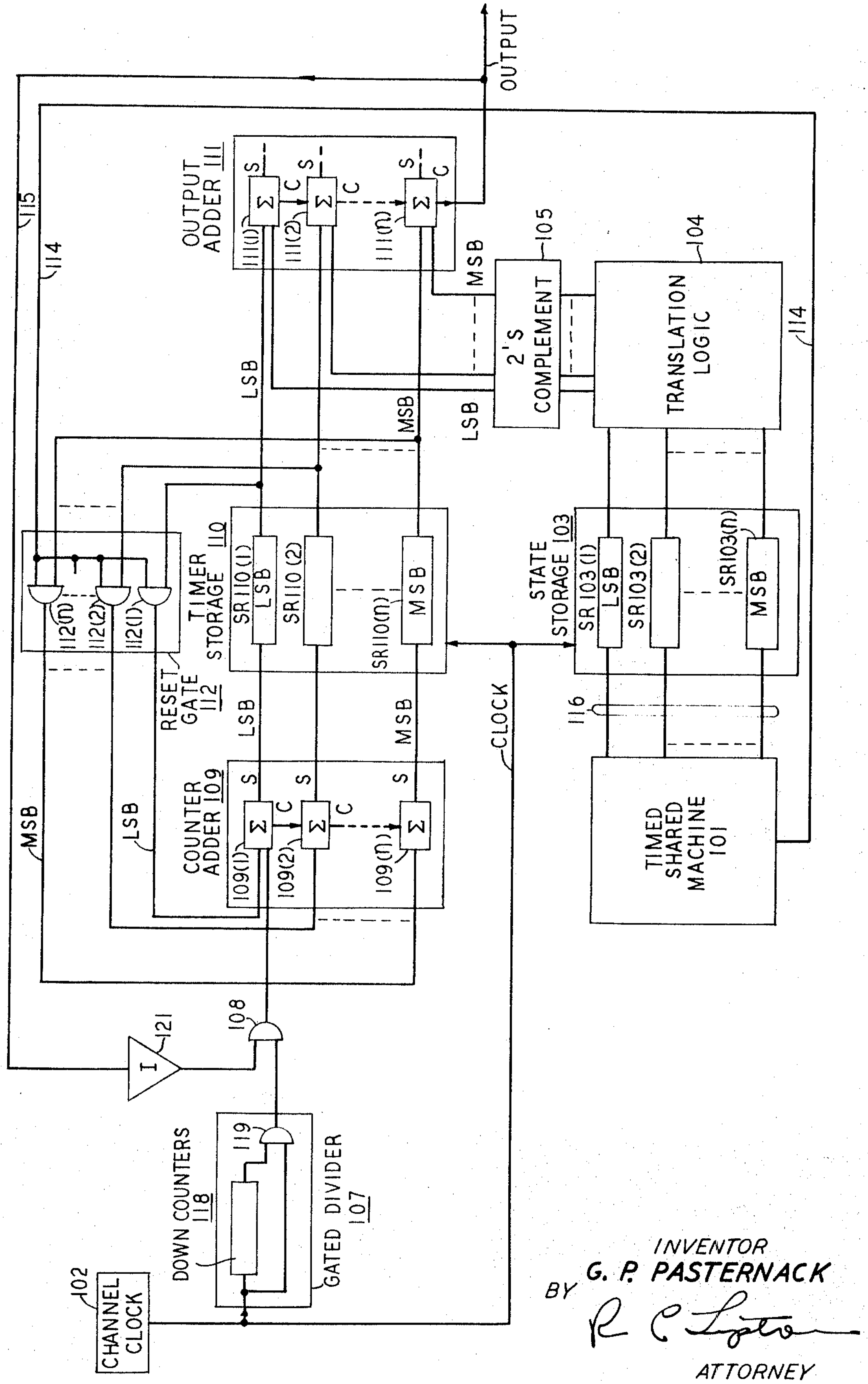
INVENTOR
G. P. PASTERNACK
BY R. C. Lipton
ATTORNEY

TIME-SHARED SHIFT REGISTER COUNTER WITH COUNT MODIFIED EACH NTH RECIRCULATION

1. FIELD OF THE INVENTION

This invention relates to counting circuits and, more particularly, to recirculating delay lines (such as shift registers) for counting digits which determine elapsed intervals of time.

2. DESCRIPTION OF THE PRIOR ART

In the data processing and switching arts, large numbers of data signaling channels are processed by a central processor which may handle the channels on a time-shared basis. One of the many functions a central processor may provide comprises timing various intervals, such as the duration of an incoming signal on a channel. Advantageously, one common timer is arranged to time one or more intervals for all the channels and is therefore also time-shared.

Time-shared timers require storage for all the channels. One such store is a delay line which may take the form of a shift register having a plurality of stages equal in number to the number of channels. The shift register stores a number, for each channel, to correspond to the interval which has expired. At a fixed time slot (which is allocated to the channel) the number is shifted to the output of the shift register and recirculated. While being recirculated, the number is passed through an adder to modify, and more specifically to increase, the count. At the same time, the output number is examined to determine the interval that has expired. The recirculating shift register therefore functions as a time-shared counter which determines time intervals.

It is to be noted that a storage element is needed for each digit of the recirculating number. Accordingly, a multistage shift register is provided for each digit. In the event that the timing of a long interval is required, the number identifying the interval becomes large. This increases the number of digits in the number and the storage requirements increase. One method of reducing the storage requirements is to divide down the input shift (pulse) rate whereby each number is stored for a longer interval between recirculations, permitting the interval identifying number to be smaller. The output number, however, is then unavailable for a correspondingly longer interval.

It is an object of this invention to provide an improved recirculating delay line counter for counting large numbers.

It is another object of this invention to reduce the storage requirements of the counter without increasing the intervals between the outputting of the stored number.

SUMMARY OF THE INVENTION

In accordance with this invention, the storage requirements are reduced by changing the modification of the count during certain ones of the recirculations. Specifically, the recirculated number count is not modified or increased during the certain ones of the recirculations.

In the illustrative embodiment of the invention, the outputs of the delay line shift registers are recirculated through an adder which is capable of adding "one" to the number count. Pulses from a channel clock, which provide the channel time slots, also provide the shift pulses for the shift registers. In addition, the pulses are divided down and the divided-down pulse enables the adder so that only one of a plurality of recirculated numbers (allocated to a channel) is increased in count. The magnitude of the number to define the elapsed time is therefore correspondingly divided down to thereby reduce the number of storage elements required to store the number while the shift pulse rate, and thus the outputting rate, is not divided down.

It is a feature of this invention that the number allocated to each channel is recirculated during the time slot allocated to the channel. The shift register stores and the adder can thus be time-shared by the various channels. In addition, an output is derived from the counter for each time slot even though the increase of the count occurs only for certain ones of the time slots.

The foregoing and other objects and features of this invention will be more fully understood from the following description of an illustrative embodiment thereof taken in conjunction with the accompanying drawings.

BRIEF DESCRIPTION OF THE DRAWING

In the single FIG. of the drawing there is depicted, in schematic form, the circuits and apparatus which form a time-shared counter timer in accordance with this invention.

DETAILED DESCRIPTION

In the specific embodiment disclosed in the drawing, a time-shared counter is utilized to determine various timing intervals. The time-shared counter generally includes timer storage 110, reset gate 112 and counter adder 109. The circuits cooperate as a recirculating shift register to store a plurality of multibit number counts allocated to a corresponding plurality of channels (the number of channels in the present arrangement being 100). Each number count (of each channel) is periodically advanced when a time interval is to be determined, the amplitude of the number being related to the timing interval, the relation being defined hereinafter. The advance of the multibit number counts is controlled by pulses derived from gated divider 107 by way of AND gate 108. Gated divider 107, in turn, is driven by channel clock 102.

The requests for the timing functions described above are made by a time-shared machine, generally indicated by block 101. Time-shared machine 101 requests a timing function by providing an enabling signal to lead 114, which lead then extends to reset gate 112. The identification of the particular timing interval desired is applied by time-shared machine 101 to output leads 116. This identity is stored by state storage 103 and is passed to translation logic 104. Translation logic 104, in turn, converts this identity to a multibit number whose amplitude corresponds to the amplitude of a multibit number which would be produced by the advance of the time-shared counter for the desired time interval. This output number of translation logic 104 is converted to its two's-complement form by complementer 105 and passed to output adder 111. Output adder 111 compares this number with the output number of the time-shared counter and pulses output lead 115 when the number output of the counter is equal to (or exceeds) the amplitude of the two's-complement of the number output of complementer 105. Adder 111 thereupon disables AND gate 108 (via inverter 121) to terminate the advance of the counter.

Time-shared machine 101 may comprise any machine which is shared by a plurality of channels or sources on a time-shared basis. A machine of this type is described, for example, in a copending application of C.A.Buzzard et al Ser. No. 884,251, filed Dec. 11, 1969. This latter machine, as described in the C.A.Buzzard et al application, comprises a multiple data set for interconnecting telephone lines and corresponding data processors on a time-shared basis. One requirement of such a time-shared machine is, for example, to time intervals between various occurrences or operations which may occur in any telephone line or corresponding data processor, which machine 101 would anticipate when in a specific state. For example, when machine 101 is in one of its many states, the indication is that the signal being received by the incoming line being processed has ceased. Time-shared machine 101 thereupon requests that a timing interval be determined to recognize whether the incoming signal is not received for that interval, which indicates there is a loss of carrier. In another one of the many states of time-shared machine 101, for example, an incoming space signal is being received on the channel being processed. Time-shared machine 101 here requests that an interval be timed to determine whether a decision to disconnect has been made by the remote transmitter (a prolonged "space" signal designates a disconnect signal). Each of these requests, and other requests, are made by time-shared machine 101 by providing signals on output lead 114 and passing signal permutations to a plurality of output leads, generally indicated by output leads 116. Time-shared machine 101, as described above, provides the multiplexing or time sharing of a plurality of lines or channels. This can be controlled by a channel clock, such as channel clock 102, or a channel clock maintained in synchronization with clock 102. Assuming that 100 channels or lines are being time shared, channel clock 102 would provide 100 time slots, or pulses, to time-shared machine 101 (in a manner not shown), each line or channel being allocated a specific one of the time slots within the cycle.

Time-shared machine 101 provides its output requests for each channel to output lead 114 and leads 116 during the time slot interval allocated to the particular channel. In the specific arrangement disclosed herein, output lead 114 has provided thereto a "0" bit when a timing function is not required and a "1" bit when a timing function is requested. The identity of the particular timing function is applied to leads 116. The number of leads *m* in leads 116 is dependent upon the number of different timing intervals which can be provided. For example, four leads would be included in leads 116 if there are $2^4$ or 16 different timing intervals, i.e., if there are, in addition to the two timing functions described above, 14 other timing intervals which time-shared machine 101 might require. Accordingly, a binary number is applied to leads 116 by time-shared machine 101, which number defines a particular one of 16 timing intervals. This binary number is passed to state storage 103.

State storage 103 stores (and delays) the binary numbers for a scanning cycle interval and then passes the numbers to translation logic circuit 104. State storage 103 advantageously comprises a plurality of shift registers, one for each of the *m* leads of leads 116. These registers are identified as shift registers SR–103(1) through SR–103(m). Each of the shift registers, such as shift register SR–103(1), comprises a plurality of shift register stages, the number of stages corresponding to the number of time slots or channels. Incoming gating pulses and shifting pulses for the shift register are provided by channel clock 102. Accordingly, the bits of each binary number on leads 116 are inserted in the first stages of the several shift registers and shifted therethrough. When the time slot, corresponding to the channel associated with the binary number, reoccurs in the next scanning cycle, the bits of the binary number are shifted out of the last stages of the shift registers to the output leads of state storage 103 for application to translation logic 104.

Translation logic 104 is a logic circuit which converts the binary number output of state storage 103 to another binary number having a different number of bits in accordance with a static program. For example, the four-bit number applied to translation logic circuit 104 is translated and converted to a six-bit binary number. Thus, the output of translation logic circuit 104 is any one of 16 six-bit numbers, dependent upon which of the 16 input numbers is applied thereto. Specifically, translation logic circuit 104 is arranged to convert the four-bit number (which defines a desired time interval) to a six-bit number whose amplitude corresponds to the amplitude attained by the number in the time-shared counter after an interval equal to the desired time. This six-bit binary number is then passed to complementer 105 and converted to the two's-complement form, whereupon it is applied to output adder 111.

As previously disclosed, the time-shared counter generally includes timer storage 110, counter adder 109 and reset gate 112. Considering first time storage 110, it is seen that the output leads thereof are passed, in parallel, to output adder 111 and to reset gate 112. As described in detail hereinafter, this output comprises a multibit binary number dedicated to each channel and appearing at the output during the time slot of the channel. This number is passed through reset gate 112 to counter adder 109 when reset gate 112 is enabled by an appropriate signal on lead 114 from time-shared machine 101. This binary number is recirculated by counter adder 109 back to timer storage 110 (assuming that AND gate 108 is not pulsing adder 109). Timer storage 110 thereupon stores the binary number for a scanning cycle, reapplying it to the output thereof during the time slot allocated to the channel during the next scanning cycle. Accordingly, assuming an enabling signal on lead 114 and no output is being provided by AND gate 108, binary numbers are recirculated by the timer on a time-shared basis for each of the channels.

Timer storage 110 comprises a plurality of shift registers, identified as shift registers SR–110(1) through SR–110(n), the number of shift registers corresponding to the number of bits in the multibit number. In accordance with the arrangement in the drawing, shift register SR–110(1) is arranged to store the least significant bit of the multibit number, while shift register SR–110(n) is arranged to store the most significant bit. Each of the shift registers is advantageously arranged to have a plurality of stages equaling the number of channels. Input gating and shift pulses for each of the shift registers is provided by channel clock 102. Accordingly, each shift register stores a particular bit of the multibit numbers for the several channels and, during the time slot allocated to any channel, is arranged to accept, at a first stage, a bit associated with the channel and concurrently provide, at the output of a last stage, a signal bit corresponding to the bit applied to its input for that channel during the previous sampling cycle. Thus, timer storage 110 provides storage and a full cycle delay for the six-bit numbers of the various channels.

Counter adder 109 includes a plurality of full adders, designated as adders 109(1) through 109(n). Thus, an adder is provided for each bit of the multibit number, with adder 109(1) dedicated to the least significant bit and adder 109(n) dedicated to the most significant bit. It is noted that the SUM output of each adder extends to the input of the corresponding shift register in timer storage 110, while the CARRY output of each adder is connected to an input of the next adder associated with the next most significant bit.

Reset gate 112, which provides the recirculation of the multibit numbers, has included therein a plurality of gates, designated as gates 112(1) through 112(n). Each gate, when enabled, interconnects the output of a shift register of timer storage 110 with the input of a corresponding adder of counter adder 109. The enabling input to each of gates 112(1) through 112(n) is connected to lead 114. As previously described, lead 114 is enabled when time-shared machine 101 desires that an interval be timed. Accordingly, when time-shared machine 101 so does desire to time an interval, reset gate 112 is enabled (during any particular time slot) to recirculate the multibit number. Conversely, when time-shared machine 101 does not request the use of the timer-counter (for any channel interval), reset gate 112 is disabled, blocking the recirculation of the multibit numbers and thereby clearing out the multibit number for the particular time slot.

Therefore, in summary, (when AND gate 108 is not passing an advance pulse to the counter), the multibit number of any channel is recirculated from the output of timer storage 110 through reset gate 112 and counter adder 109 back to the input of timer storage 110. Timer storage 110 at the same time provides a delay of each multibit number for one full sampling cycle.

As previously described, the advance pulses for the time-shared counter are provided by gated divider 107 by way of AND gate 108, gated divider 107 being driven, in turn, by channel clock 102. It is a function of gated divider 107 to divide down the output pulses from channel clock 102 to thereby pass, with respect to any channel, only one out of a plurality of pulses. In this specific embodiment, for example, gated divider 107 is arranged to pass only one channel pulse for every 2,000 channel pulses allocated to a channel. Gated divider 107 includes downcounters 118 and AND gate 119.

Downcounters 118 advantageously include a first downcounter which selects or determines the channel sampling cycle interval. Insofar as we have provided 100 channels, the first downcounter in downcounters 118 divides by 100, whereby the output thereof comprises pulse intervals corresponding to each of successive sampling cycle intervals. Downcounters 118 further include downcounters which divide down the sampling cycle pulses and select one of these sampling cycle pulses. In the present example, we have down counted by 2,000. Accordingly, the final output of downcounters 118 comprises one out of every 2,000 sampling cycle interval pulses. This sampling cycle interval pulse is passed to AND gate 119, which thereupon passes the channel pulses on channel clock 102 for this sampling cycle interval. Accordingly, the output of AND gate 119 comprises the 100 channel or time slot pulses for a sampling cycle interval, whereupon AND gate 119 is blocked by downcounters 118 until the next $2,000^{th}$ sampling cycle interval occurs. Gate 119 thereupon clocks through 100 clock pulses for each $2,000^{th}$ interval, thereby passing for each channel only one pulse per each 2,000.

The output of AND gate 119 is passed to AND gate 108. As previously discussed, the other input to AND gate 108 is connected to lead 115. As described hereinafter, this lead is normally down (until a timing interval terminates). This potential on lead 115 is inverted by inverter 121 to normally enable AND gate 108. Thus, assuming gate 108 is enabled, when the $2,000^{th}$ interval occurs a clock pulse will pass therethrough to counter adder 109 and, more specifically, to an input of adder 109(1).

It is seen that with one input to adder 109(1) from gate 108 and, as recalled, the other input being the least significant bit of the multibit number dedicated to the channel, adder 109(1) will add the bit from gate 108 to the least significant bit, applying the sum to timer storage 110 and the carry to the next adder, which, in this case, is adder 109(2). Accordingly, counter adder 109 adds a "1" bit to the least significant bit of the multibit number and thereby advances the number of the count by 1. This number is then recirculated, as described above, for 2,000 times and, assuming AND gate 108 is still enabled, the number is then again advanced by 1. This process is continued so long as time-shared machine 101 is still requesting that an interval be timed for this particular channel (and therefore reset gate 112 is still enabled) and so long as the termination of the particular interval is not attained (gate 108 is still enabled).

It is of interest to note that the maximum amplitude of the stored number in the time-shared counter (using six bits in the number) is $2^6$ or 64. Utilizing the 2,000 downcount of the "add" or "advance" pulse provides an equivalent number amplitude of 128,000 — an amplitude which would require a 17-bit number with corresponding shift registers, adders and gates for each bit. Nevertheless, with shifting of the shift registers provided directly by channel clock 102, timer storage 110 provides a number count output for each time slot during each scanning cycle, which number count can be utilized to determine the full number amplitude by multiplying by the downcount. Thus, the quantity of the components necessary to count is reduced while outputting for each time slot is retained.

The output of timer storage 110, as previously described, is also passed to output adder 111. Output adder 111 is arranged to compare the number supplied by the counter with the number provided by translation logic 104. Since the number from translation logic 104 is in the two's—complement form, as converted by complementer 105, output adder 111 will provide an output when the two most significant bits of the numbers, when added, require a carry.

Output adder 111 comprises a plurality of adders, identified as adders 111(1) through 111(n), adder 111(1) being dedicated to the least significant bit and adder 111(n) being dedicated to the most significant bit. The least significant bit of the output number of timer storage 110 and the least significant bit of the output number of two's-complementer 105 are passed to the input of adder 111(1). Similarly, the most significant bit output of timer storage 110 and the most significant bit output of complementer 105 are passed to the input of adder 111(n). The carry outputs of each of the adders are passed to the inputs of the adders allocated to the next most significant bit and the carry output of adder 111(n) is connected to lead 115 and the output terminal of the circuit. Accordingly, a carry output is provided by output adder 111 when the number attained by the timer counter equals the number output of translation logic 104 since the number output of translation logic 104 has been converted to the two's-complement form. This output carry bit is then used (by means not shown) to advise time-shared machine 101 that the timer has been timing for the duration indicated by leads 116. In addition, the output carry bit is passed to lead 115 to block gate 108 to preclude the further advance of the counter, as previously described.

It is, of course, obvious that time-shared machine 101 at this time has the option of removing the request signal from lead 114 and thus clearing out the counter, as previously described. Alternatively, time-shared machine 101 could have, of course, maintained the enabled signal on lead 114 and the request on lead 116. Since gate 108 is now disabled, however, additional counting would not occur. The effect, however, would be to store the indication that the timing interval has been attained and a timeout of the interval has occurred.

Although a specific embodiment of this invention has been shown and described, it will be understood that various modifications may be made without departing from the spirit of this invention.

I claim:

1. A counting system time-shared by a plurality of channels comprising,
   - means for allocating a time slot to each of the channels,
   - means for storing a number for each of the channels, said storing means being controlled by the allocating means for applying each channel number to an output of the storing means during each of the successive time slots of the corresponding channel,
   - means for recirculating the stored number of each channel during the time slot allocated to the channel from the output of the storing means back to the input thereof, and
   - means effective during each $n^{th}$ one of the recirculations of the number of each channel for modifying the magnitude of the recirculated number and effective during the remaining ones of the recirculations for precluding the modification of the magnitude of the recirculated number.

2. A counting system in accordance with claim 1 wherein the modifying means comprises means for adding an increment to the recirculated number.

3. A counting system in accordance with claim 1 wherein the allocating means includes a channel clock for generating a clock pulse for each time slot and the modifying means includes means for dividing down the clock pulses to determine the $n^{th}$ ones of the recirculations.

4. A counting system in accordance with claim 3 wherein the storing means includes a shift register having a plurality of stages equal in number to the number of channels and means responsive to each channel clock pulse for applying a shift pulse to the shift register.

* * * * *